(12) United States Patent
Dom et al.

(10) Patent No.: US 7,870,039 B1
(45) Date of Patent: Jan. 11, 2011

(54) AUTOMATIC PRODUCT CATEGORIZATION

(75) Inventors: Byron Edward Dom, Los Gatos, CA (US); Abhishek Goyal, Bangalore (IN); Ramnath Balasubramanyan, Bangalore (IN); Dmitry Pavlov, Sunnyvale, CA (US); Bipin Suresh, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 802 days.

(21) Appl. No.: 10/920,588

(22) Filed: Aug. 17, 2004

Related U.S. Application Data

(60) Provisional application No. 60/548,346, filed on Feb. 27, 2004.

(51) Int. Cl.
G06F 17/30 (2006.01)
(52) U.S. Cl. .......................................... 705/27; 705/26
(58) Field of Classification Search .................. 705/26, 705/27
See application file for complete search history.

(56) References Cited

U.S. PATENT DOCUMENTS

| | | | |
|---|---|---|---|
| 5,815,689 A | 9/1998 | Shaw et al. | |
| 6,055,515 A | 4/2000 | Consentino et al. | |
| 6,412,012 B1 | 6/2002 | Bieganski et al. | |
| 6,438,543 B1 | 8/2002 | Kazi et al. | |
| 6,578,030 B1* | 6/2003 | Wilmsen et al. | 707/3 |
| 6,633,852 B1 | 10/2003 | Heckerman et al. | |
| 6,697,799 B1* | 2/2004 | Neal et al. | 707/3 |
| 6,728,752 B1 | 4/2004 | Chen et al. | |
| 6,751,600 B1* | 6/2004 | Wolin | 706/12 |
| 6,785,671 B1 | 8/2004 | Bailey et al. | |
| 6,910,044 B2* | 6/2005 | Weinberg et al. | 707/792 |
| 6,947,936 B1 | 9/2005 | Suermondt et al. | |
| 7,082,426 B2 | 7/2006 | Musgrove et al. | |
| 7,086,002 B2 | 8/2006 | Elo et al. | |
| 7,117,207 B1 | 10/2006 | Kerschberg et al. | |
| 7,225,146 B2 | 5/2007 | Tenorio | |
| 7,319,971 B2 | 1/2008 | Abrahams et al. | |
| 2001/0044758 A1 | 11/2001 | Talib et al. | |
| 2002/0055903 A1 | 5/2002 | Solomon | |
| 2002/0062258 A1 | 5/2002 | Bailey et al. | |

(Continued)

OTHER PUBLICATIONS

David D. Lewis, "Naive (Bayes) at forty: The independence assumption in information retrieval"; in Claire N'edellec and C'eline Rouveirol, editors, Proceedings of ECML-98, 10th European Conference on Machine Learning, No. 1398, pp. 4-15, Chemnitz, DE, 1998.

(Continued)

*Primary Examiner*—Jason Dunham
(74) *Attorney, Agent, or Firm*—Hickman Palermo Truong & Becker LLP; Edward A. Becker

(57) ABSTRACT

Techniques are provided for automatic product categorization. In one aspect, the categorization is based on text and one or more other values associated with a product offering. In another aspect, a first categorization of a product offering is performed and, if the product category chosen is in a set of co-refinable product categories, then a second (or third, fourth and so on) categorization is performed among the set of co-refinable product categories. In a third aspect, products are categorized based on cost. In another aspect, after products are categorized, the products are flagged for further categorization processing if the cost for categorizing the product is beyond a predefined threshold.

42 Claims, 8 Drawing Sheets

U.S. PATENT DOCUMENTS

| | | |
|---|---|---|
| 2002/0077930 A1 | 6/2002 | Trubey et al. |
| 2002/0184116 A1 | 12/2002 | Tam et al. |
| 2003/0101104 A1 | 5/2003 | Dimitrova et al. |
| 2003/0120662 A1* | 6/2003 | Vishik ......................... 707/100 |
| 2003/0149675 A1 | 8/2003 | Ansari et al. |
| 2003/0204447 A1 | 10/2003 | Dalzell et al. |
| 2004/0015408 A1* | 1/2004 | Rauen et al. .................. 705/26 |
| 2004/0093331 A1 | 5/2004 | Garner et al. |
| 2004/0193591 A1* | 9/2004 | Winter ........................... 707/3 |
| 2004/0249831 A1 | 12/2004 | Fagin et al. |
| 2005/0149390 A1 | 7/2005 | Scholl et al. |
| 2006/0064411 A1 | 3/2006 | Gross et al. |
| 2006/0095270 A1* | 5/2006 | Somerville ..................... 705/1 |
| 2006/0095370 A1 | 5/2006 | Seth et al. |
| 2006/0184430 A1 | 8/2006 | Gavarini |
| 2006/0282339 A1* | 12/2006 | Musgrove et al. ............. 705/27 |
| 2007/0022021 A1* | 1/2007 | Walker et al. ................. 705/26 |
| 2010/0057806 A1 | 3/2010 | Neal et al. |

OTHER PUBLICATIONS

M.F. Porter. "An algorithm for suffix stripping"; Program, 14(3):130-137, 1980. Reprinted in Sparck Jones, Karen, and Peter Willet, 1997, Readings in Information Retrieval, San Francisco: Morgan Kaufmann, ISBN 1-55860-454-4.

U.S. Appl. No. 10/789,837, Final Office Action, mailed Apr. 15, 2008, 18 pages.

Softface: Softface to create structured catalog content for leading school supplier. M2 Presswire. Coventry, May 24, 2001, pp. 1-2.

* cited by examiner

AUTOMATIC PRODUCT CATEGORIZATION

RELATED APPLICATIONS

This application claims benefit of priority to U.S. Provisional Application Ser. No. 60/548,346 entitled "AUTOMATIC PRODUCT CATEGORIZER", filed Feb. 27, 2004 by Byron Edward Dom et al. which is incorporated by reference in its entirety for all purposes as if fully set forth herein.

This application is related to U.S. patent application Ser. No. 10/789,839 filed Feb. 26, 2004 entitled "SCORING MECHANISM SELECTION ALONG MULTIPLE DIMENSIONS" naming Acton et al. as inventors, which is incorporated by reference in its entirety for all purposes as if fully set forth herein. Herein referred to as '839.

This application is related to U.S. patent application Ser. No. 10/789,837 filed Feb. 26, 2004 entitled "PRODUCT DATA CLASSIFICATION" naming Acton et al. as inventors, which is incorporated by reference in its entirety for all purposes as if fully set forth herein. Herein referred to as '837.

This application is related to U.S. patent application Ser. No. 10/788,537 filed Feb. 26, 2004 entitled "ASSOCIATING PRODUCT OFFERINGS WITH PRODUCT ABSTRACTIONS" naming Acton et al. as inventors, which is incorporated by reference in its entirety for all purposes as if fully set forth herein. Herein referred to as '537.

FIELD OF THE INVENTION

The present invention relates to data categorization. The invention is related more specifically to automatic product categorization.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It is becoming increasingly common for shoppers to search for the particular product in which they are interested using electronic search mechanisms, such as Internet-based search engines. As used herein, the term "product" refers to any form of sellable unit, including services, intangibles, and physical and software products. The complex systems used by such electronic search mechanisms to process incoming product data from multiple merchants, and deliver that product data in the form of search results to millions of customers, must ensure that customers receive the best information available. In order to do this, data that represents an offer to sell a particular product by a particular party, referred to herein as "product offering information", must be obtained for multiple product offerings. Once obtained, the information must be categorized in order to, among other things, determine how much merchants associated with the product offerings are charged for inclusion of the product offerings in the corresponding search mechanism. Merchants are often charged a certain amount of money by the search engine owner every time a product of the merchant is selected by a user of the search mechanism—a cost-per-click (CPC) charge.

One approach to categorizing product offerings is the manual categorization approach. In the manual categorization approach, a human operator assigns product offerings to product categories. A problem with the manual categorization approach is that it is time and resource consuming, since a human operator must assign each product offering to a product category.

Therefore, based on the foregoing, it is clearly desirable to provide a mechanism for automatic product categorization.

SUMMARY

Techniques are provided for automatic product categorization. In one aspect, the categorization of product offerings is based, in part on one or more values that are separate and distinct from the actual text of the product offering. The values may be, for example, Merchant ID, Brand, Price, or any product field. The existence of a particular field as opposed to the value of the field may also indicate particular product categories. For example, a product offering that has a "carat weight" attribute is likely to belong to a jewelry-related category, regardless of the value of the carat weight attribute.

In another aspect, a first categorization of a product offering is performed and, if the product category chosen is in a set of co-refinable product categories, then a second categorization is performed among the set of co-refinable product categories. The set of co-refinable product categories may be determined in any appropriate manner, including by computing a confusion matrix based on differences between the results of a manual categorization and the results of an automatic categorization of a set of product offerings.

In another aspect, product offerings are categorized based at least in part on the cost of categorizing offerings into a particular product category. The cost of categorizing a product offering into a particular product category may be based on any appropriate equation, may be a penalty cost, and may be based on the revenue potentially lost if the chosen product category is the incorrect one. The product category is chosen for a product offering in part based on the cost associate with categorizing the product offering into the product category.

In another aspect, after products are categorized, further categorization processing is performed if the cost for categorizing the product is beyond a predefined limit. The same cost equations as used above may also be used here. The further processing may include flagging the product offering for manual review or performing a more computationally expensive categorization process on the product offering.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
- 1.0 System Overview
- 1.1 Product Gathering Unit
- 1.2 Product Categorization Unit
- 2.0 Functional Overview
- 3.0 Examples of Automatic Categorization
- 3.1 Input Data Format
- 3.2 Lexical Analysis
- 3.3 Features Computed from Text Tokens
- 3.4 Non-Text Features
- 3.5 Feature Selection
- 3.6 Category Refinement
- 3.7 Merchant ID
- 3.8 Price
- 3.9 Special Rules
- 3.10 Selecting Products for Manual Review: Confidence and Expected Cost
  - 3.10.1 Confidence
  - 3.10.2 The Actual Cost of Miscategorized Products
  - 3.10.3 Expected Cost
- 3.11 Automatic Categorization Based on Expected Cost
- 4.0 Hardware Overview
- 5.0 Naive Bayes
- 5.1 The Naive Bayes Assumption
- 5.2 The Naive Bayes Classifier for Text
- 5.3 Naive Bayes for Non-Text Attributes (Features)
- 6.0 Extensions and Alternatives

1.0 SYSTEM OVERVIEW

The techniques described herein may be implemented on any appropriate machine or set of machines. The data for product offerings and product categories may come from one or more data sources and the data sources may be product databases, product catalogs, results of web searches, or any other appropriate data source. The techniques for product categorization may execute on a single machine or may execute on multiple physical machines. Various embodiments of machines are described below in the section entitled Hardware Overview. The techniques described herein may execute as part of search mechanisms. Example search mechanisms are described in '839, '837, and '537.

Figure 1:
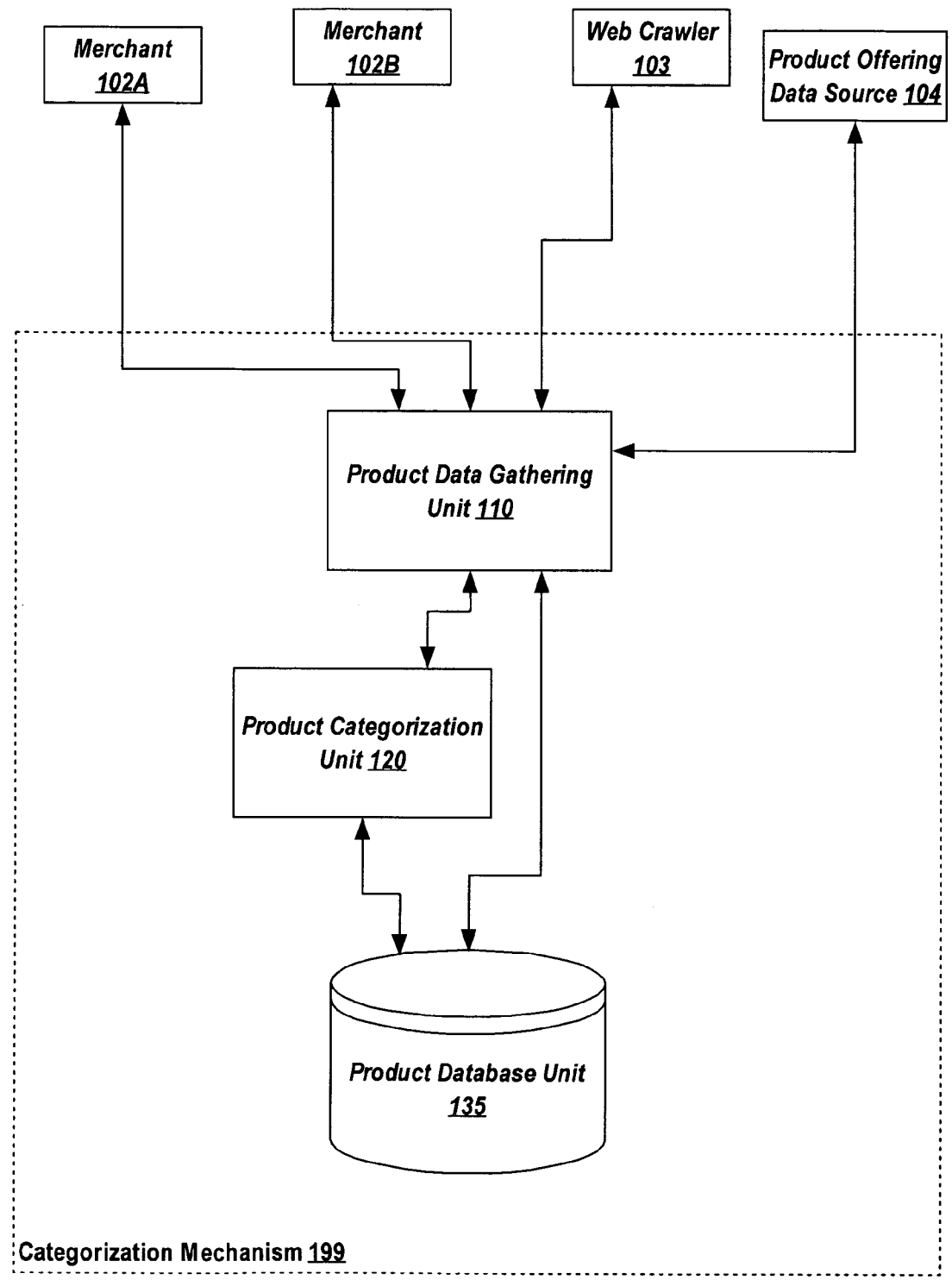
FIG. 1 is a block diagram of an automatic product categorizer according to one embodiment of the invention.

FIG. 1 is a block diagram of an automatic product categorizer according to one embodiment of the invention. Techniques are described hereafter for automatically categorizing a product offering. The embodiment illustrated in FIG. 1 includes the following components:

one or more merchants 102A, 102B that submit or make available product offering data to the product data gathering unit 110;

one or more web crawlers 103 which collect product offering data which is made available to the product data gathering unit 110;

one or more product offering data sources 104, which are any electronic sources of product offering data for the product data gathering unit 110; and a categorizing mechanism 199 comprising:

a product data gathering unit 110 for bringing data into the system;

a product classification unit 120 for associating product offerings with product categories; and a product database unit 135 for storing information related to product offerings, merchants, product categories, and the mappings among them.

Embodiments of the various components of the categorizing mechanism 199, including the product data gathering unit 110, the product classification unit 120, and the product database unit 135 are described below.

1.1 Product Gathering Unit

The product data gathering unit 110 obtains data, corresponding to one or more product offerings, from one or more merchants 102A, 102B, one or more web crawlers 103, and any other appropriate product offering data source 104.

The product data gathering unit 110 may obtain data from these sources using any of a number of protocols, including file transfer protocol (FTP), rsync, hypertext transfer protocol (HTTP), secure HTTP (HTTPS), and TCP/IP (transaction control protocol/Internet protocol) sockets. Product offering data may also be provided to the product data gathering unit 110 via a machine-readable medium, such as a compact disk (CD). In a related scenario, the product data gathering unit 110 may read the product offering data directly from the CD or machine-readable medium. The product offering data on the machine-readable media may be, for example, a product catalog. The product offering data may be in any of a number of formats including hypertext markup language (HTML), extensible markup language (XML), electronic data interchange (EDI), and character-delimited formats. Additionally, a web crawler 103 may collect product offering data from one or more web sites and the product data gathering unit 110 may obtain product data from the web crawler 103 over a network or via a machine-readable medium.

Each of merchants 102A, 102B generally represents a person or company offering to sell a product. To interact with the product data gathering unit 110, a merchant 102A may, for example, upload data associated with a product offering to a website associated with the product data gathering unit 110 via HTTP. A web crawler 103 is a set of one or more processes working in concert to gather web page information from the Internet, a private Intranet, or any other electronic collection of web pages. Other product offering data sources 104 may be any electronic source of product offering data for the product data gathering unit 110. An example product offering data source 104 may be an electronic version of a product catalog provided to the product data gathering unit 110 on a compact disk (CD).

1.2 Product Categorization Unit

The product categorization unit 120 is communicatively coupled to both the product data gathering unit 110 and the product database unit 135. In the illustrated embodiment, each of these units 110, 120, 135 runs on a separate computer. In alternative embodiments, one or more of these units may be implemented to run as separate processes running on the same computer; one or more units may be implemented to each run on multiple processors; multiple units may be implemented to run within a single process; or all entities in the categorizing mechanism 199 may be implemented as a single process.

The functioning of the product categorization unit 120 is described in more detail below. In general, however, the product categorization unit 120 matches product offering data obtained by the product data gathering unit 110 to product categories.

2.0 FUNCTIONAL OVERVIEW

Figure 2:
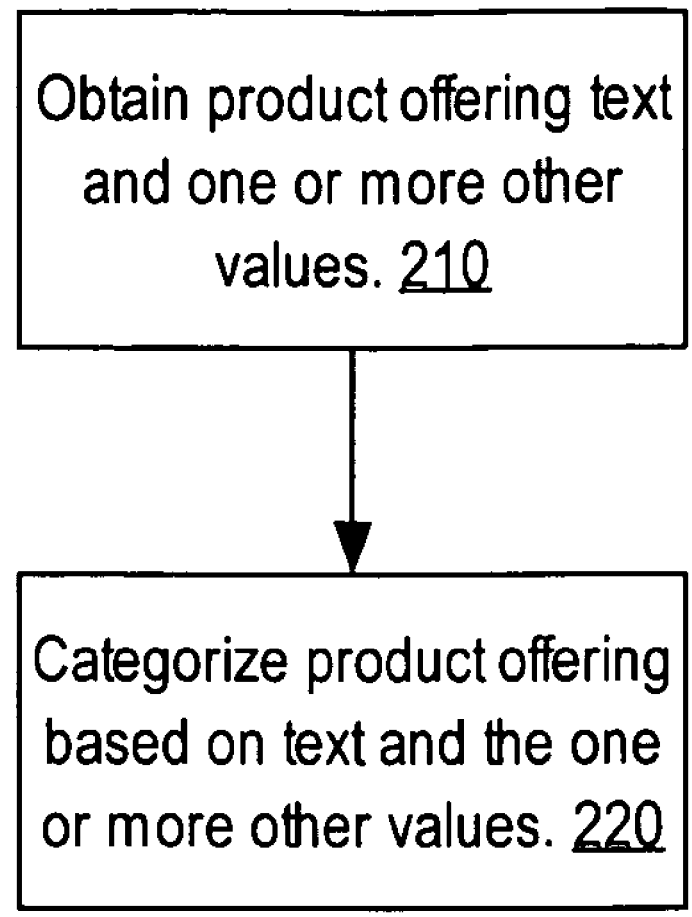
FIG. 2 is a flow diagram depicting a process for automatically categorizing a product offering.

FIG. 2 is a flow diagram depicting a process for automatically categorizing a product offering.

In step 210, data associated with the product offering is obtained. In various embodiments, the data is obtained by downloading the product offering data from the Internet, receiving the product offering data from a merchant, or any appropriate means. For example, in the context of FIG. 1, the product data gathering unit 110 obtains the product offering data from a Merchant 102A, web crawler 103, or other product offering data source 104.

In various embodiments, the product offering data includes the text associated with the product offering and one or more other values that are distinct and separate from the product offering text. The text may be, for example, a human-readable description of the product, a title, or other text associated with the product offering. The separate values may be, for example, merchant ID, brand information, price of the product, or any other appropriate value. Various examples of product offering text and product offering values are described in the sections entitled Input Data Format, Lexical Analysis, Features Computed from Text Tokens, Non-Text Features, Feature Selection, Merchant ID, Price, and Special Rules.

In step 220, the product is categorized based on the product offering text and the one or more other values. In various embodiments, the product offering text is tokenized, analyzed by a lexical analyzer, or processed in any appropriate fashion. One such embodiment is described in the section entitled Lexical Analysis. In various embodiments, the results of processing the text and the results of processing the product offering values are used in conjunction to categorize the product offering. Categorization based on product offering text and separate product offering values is discussed more below in the section entitled Examples of Automatic Categorization.

Figure 3:
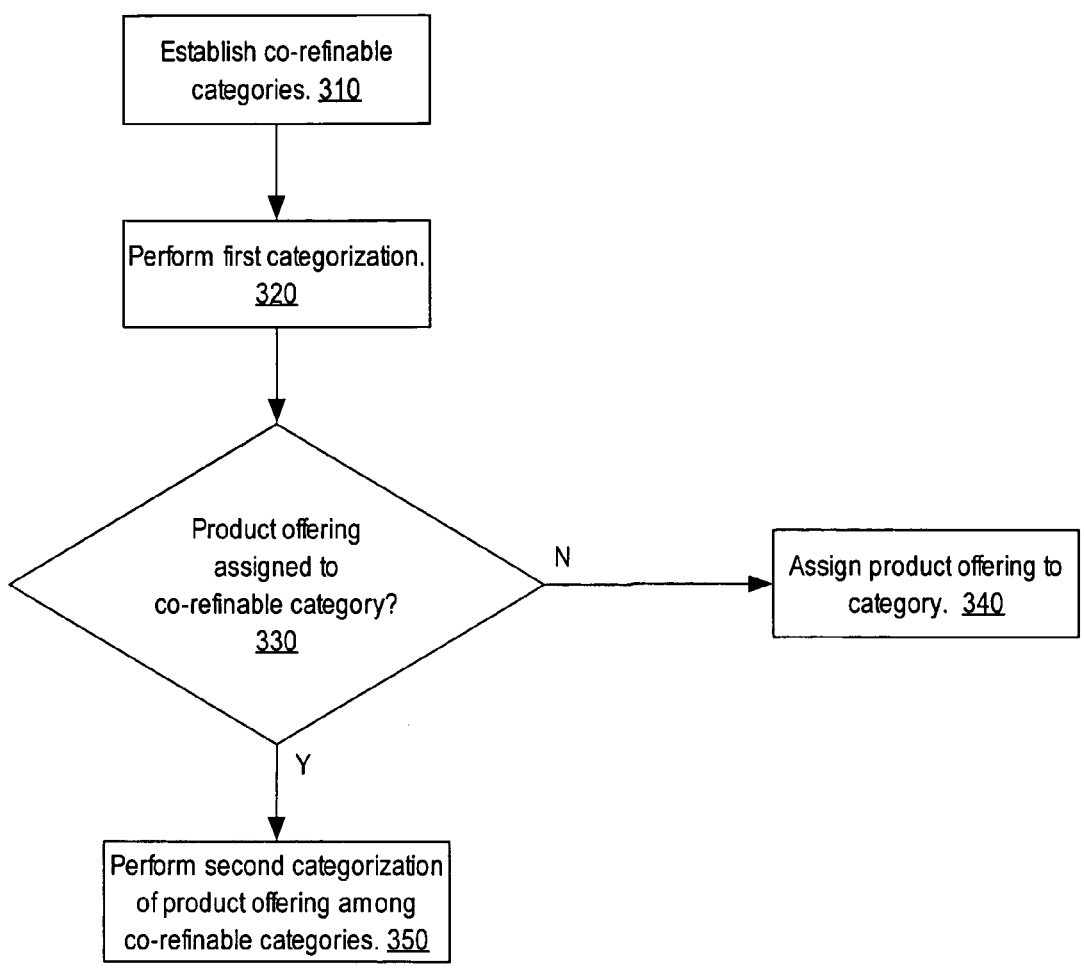
FIG. 3 is a flow diagram that depicts a second process for automatically categorizing a product offering.

FIG. 3 is a flow diagram that depicts a second process for automatically categorizing a product offering.

In step 310, a set of co-refinable product categories is established. As used herein, a particular product category is considered "co-refinable" relative to another product category if there is a relatively high likelihood that product offerings that are misassigned to the particular product category should actually have been assigned to the other product category. For example, the product category "diamond rings" may be co-refinable with the product category "ruby rings", but not with the product category "mouse traps".

Thus, the phrase "set of co-refinable product categories" refers to a plurality of product categories, where products that are incorrectly assigned to one category in the set are likely to actually belong to another category in the set. For example, the categories "diamond rings", "ruby rings", "sapphire rings" and "ear rings" may constitute a set of co-refinable product categories.

In various embodiments, one or more sets of co-refinable product categories are established manually. Alternatively, sets of co-refinable product categories can be established by (1) performing a first categorization operation on a set of product offerings using one categorization method, (2) performing a second categorization operation on the same set of product offerings using a second categorization method, and (3) determining discrepancies between the results of the first and second categorization operations. Specifically, categories can be assigned to a set of co-refinable product categories based on the discrepancies. For example, if an automatic categorization and a manual categorization are performed on the same set of product offerings, then the set of co-refinable product categories may be determined to be the set of product categories that are often confused, as evidenced by the discrepancy between the results of the manual and automatic product categorizations.

Alternatively, the set of co-refinable product categories may be established by determining, for each product category in the plurality of product categories, the likelihood that a given product offering in the product category would be mistakenly categorized into each other category in the plurality of product categories; and assigning two or more categories that are most likely to be confused with each other to the set of co-refinable product categories. In one embodiment, the set of co-refinable product categories is a proper subset of the full set of product categories. That is, the set of co-refinable product categories includes two to N−1 product categories from the full set of product categories, where the full set contains N product categories.

Under some circumstances, the full set of product categories will have several distinct sets of co-refinable product categories. For example, one set of co-refinable product categories may include the categories "ruby rings", "diamond rings", and "ear rings", while a separate set of co-refinable product categories includes "sports cars", "mid-size cars" and "miniature cars". Various embodiments of establishing co-refinable product categories are defined below in the section entitled Category Refinement.

Establishing the set of co-refinable product categories may include storing data that identifies which categories belong to each of the sets of co-refinable product categories. For example, in the context of FIG. 1, an indication of the set of co-refinable product categories is stored in the product database unit 135.

In step 320, a first product categorization is performed, during which a product offering is assigned to a product category. In various embodiments, a categorization as described with respect to FIG. 2, FIG. 4, or FIG. 5, a Bayesian categorization, a keyword matching, or any other categorization of the product is performed. In various embodiments, a categorization as described in the sections entitled Examples of Automatic Categorization, Category Refinement, and Automatic Categorization Based on Expected Cost is performed.

In step 330, a check is performed to determine if the product category to which the product offering is assigned during the first product categorization is a co-refinable product category. In various embodiments, performing this check includes accessing a flag associated with the product category, comparing the product category to a list of co-refinable product categories, or any other appropriate check. For example, in the context of FIG. 1, a product categorization unit 120 accesses the product database unit 135 to check whether a product category is in a set of co-refinable product categories.

If the product offering to which the product offering has been assigned is not a co-refinable product category, then in step 340 the product offering remains assigned to the product category. In various embodiments, assigning a product to a category includes writing a record to a database, a data structure, a file, or other machine-readable medium, indicating the assignment of the product offering to the product category. For example, in the context of FIG. 1, assigning the product offering to a product category includes writing an indication of the mapping from the product offering to the product category in the product database unit 135.

If, during the first categorization operation, the product offering has been assigned to a product category that belongs to a particular established set of co-refinable product categories, then in step 350, a second categorization operation is performed on the product offering. However, unlike the first categorization operation, during the second categorization operation, not all of the product categories are considered candidates to be assigned to the product offering. Rather, the second categorization operation limits the candidate set of categories to those categories that belong to the particular set of co-refinable product categories. For example, if the first categorization operation assigned a product offering to the "diamond ring" category, then during the second categorization operation, only the "diamond ring", "ruby ring" and "ear rings" categories are considered candidates that can be assigned to that particular product offering. Additionally, the second categorization may use a different feature set than the first.

In one embodiment, the second categorization includes assigning the product offering to one category within the set of co-refinable product categories. The second categorization may be more computationally expensive than the first categorization. According to one embodiment, the second categorization of a product offering is only performed if the product offering is categorized into a co-refinable category during the first categorization operation. Since the more expensive categorization method is only performed on a subset of the product offerings, the overall computational load is less than if the more expensive (and presumably more accurate) categorization method were performed on all product offerings.

Even if the second categorization operation is not more computationally expensive than the first categorization operation, then the second categorization among the co-refinable product categories may still improve the overall accuracy of the categorization. Various embodiments of categorization are described with respect to FIGS. 2, 4, 5 and in the sections entitled Examples of Automatic Categorization, Category Refinement, and Automatic Categorization Based on Expected Cost.

Figure 4:
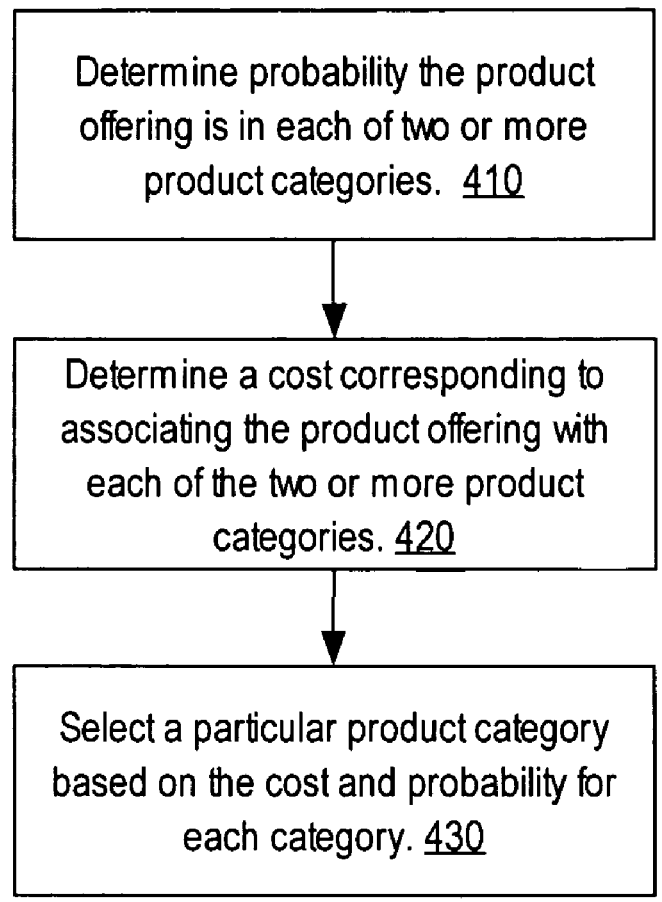
FIG. 4 is a flow diagram that depicts a third process for automatically categorizing a product offering.

FIG. 4 is a flow diagram that depicts a third process for automatically categorizing a product offering.

In step 410, for each of two or more product categories, a probability that the product offering should be assigned to the product category is determined. For example, it may be determined that there is a 0.3 probability that the product offering should be assigned to product category X, and that there is a 0.4 probability that the same product offering should be assigned to product category Y.

The probability that the product offering should be assigned to each product category may be determined as part of a product offering categorization. Various embodiments of product offering categorization are described with respect to FIG. 2, FIG. 3, FIG. 5, and in the sections entitled Examples of Automatic Categorization, Category Refinement, and Automatic Categorization Based on Expected Cost.

In step 420, an "assignment-error cost" corresponding to categorizing the product offering in each of the two or more product categories is determined. The assignment-error cost for a particular category may be, for example, an estimate of the magnitude of the error if the assignment of the product offering the particular product category turns out to be erroneous. The magnitude of the error may, for example, be based on (1) how much the merchant associated with the product offering would be charged because of the assignment to the erroneous category, compared to (2) how much the merchant would have been charged if the product offering had been assigned to the correct category.

The assignment-error cost for each product category may, for example, be based on (1) the amount charged for the category, (2) the amount charged for one or more of the other categories, (3) the probability that the product offering should be assigned to the category, and (4) the probability that the product offering should be assigned to each of the other categories. Various embodiments of cost calculations are described in the section entitled The Actual Cost of Miscategorized Products and Expected Cost.

In step 430, the product offering is assigned to a particular product category based on the assignment-error costs and the probabilities for each of the product categories. Depending on the implementation, the product category may be selected based on a number of factors including the one with the lowest assignment-error cost, the one with the highest merchant cost, or a combination of assignment-error cost, merchant cost, and probability. For example, in the context of FIG. 1, a product offering is assigned to a product category by writing a record to the product database unit 135. Various embodiments of equations for assigning product offering to product categories based on cost are described in the section entitled Automatic Categorization Based on Expected Cost.

Various embodiments of FIG. 4 enable the categorization of a product offering based on assignment-error cost. This categorization may be based on any appropriate equation and may take into account factors such as money lost if the product is incorrectly categorized due to lost revenue (cost-per-click) and potential lost revenue due to merchant dissatisfaction for having their product misclassified. Example embodiments of categorizing based on cost are described in the section entitled Automatic Categorization Based on Expected Cost.

Figure 5:
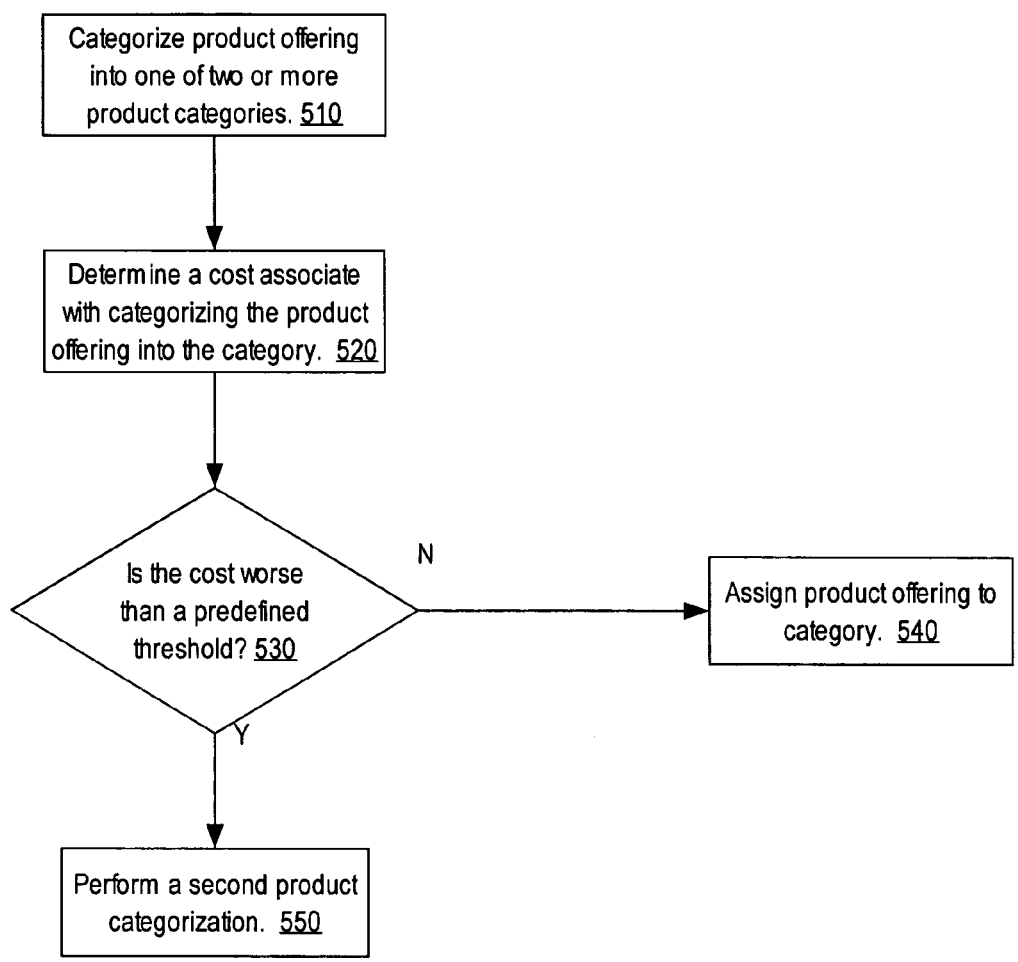
FIG. 5 is a flow diagram that depicts a fourth process for automatically categorizing a product offering.

FIG. 5 is a flow diagram that depicts a fourth process for automatically categorizing a product offering.

In step 510, the product offering is categorized into a particular product category from among a set of two or more product categories. Various embodiments of categorizing a product offering are described above with respect to FIG. 1, FIG. 2, FIG. 3, and FIG. 4, as well as in the sections entitled Examples of Automatic Categorization, Category Refinement, and Automatic Categorization Based on Expected Cost.

In step 520, an assignment-error cost associated with the categorization of the product into the particular product category is determined. Various embodiments of assignment-error cost calculations are described above with respect to step 420 and in the sections entitled The Actual Cost of Miscategorized Products and Expected Cost.

In step 530, a check is performed to determine if the assignment-error cost is above a certain threshold. In the example herein, a high cost is less desirable, therefore a check is performed to determine whether the assignment-error cost is above a predefined threshold. Alternatively, and based on the calculation of the cost, lower cost values may represent assignment errors of greater magnitude, and therefore a check may be performed in step 530 to determine whether the cost is below a certain threshold.

If the cost is not above the predefined threshold, then in step 540, the product offering is assigned to the product category. Various embodiments of assigning a product offering to a product category are described with respect to step 430.

If the cost is above the predefined threshold, then in step 550, an additional categorization operation for the product offering is performed. The additional categorization operation may include flagging the product offering for manual review or enabling a human operator to manually assign the product offering to a category. Flagging the product offering for manual review may include writing a record to a database or modifying a record in a database, writing to a file or other machine-readable-media, or any appropriate operation. Enabling a human operator to manually assign a product category for the product offering may include writing a record to or modifying a record in a database or providing another indication that the product offering may be manually assigned a product category. For example, in the context of FIG. 1, a product offering is flagged for review by writing a record to the product database unit 135.

The additional categorization operation may also be a second automated categorization operation and, furthermore, may be a more expensive categorization operation than the categorization operation that initially selected the particular category. A second categorization may be a categorization of the product offering over the same full set of product categories, or may be a second categorization over a smaller set of categories. The second categorization operation may also include performing a check to determine whether the product category to which the product offering has been categorized is in a set of co-refinable product categories. If the product category is in a set of co-refinable product categories, then a second categorization may be performed to assign the product offering to one of the co-refinable product categories. Example embodiments of performing a second, refining categorization are described above with respect to FIG. 3 and in the section entitled Category Refinement.

Various embodiments of FIG. 5 enable a determination, based on cost, of which categorizations of product offerings should be processed or reviewed further. In various embodiments, the further processing may be a second, possibly more expensive, categorization, a flagging for manual review, enabling a human operator to manually assign a category, or any appropriate action.

3.0 EXAMPLES OF AUTOMATIC CATEGORIZATION

3.1 Input Data Format

The following is an example product record. Line breaks may be added for readability. The fields present vary with the type of merchant/product.

<title:Spray Roses And Rose Notecards><price:4299>
<prod_source:cann><ppath:Flowers_Gifts_Registry.
    Flowers/>
<mid:mid=11948><description:
Pierre Joseph Redoute was the celebrated botanical artist of the 1700s who created faithful depictions of legendary heirloom roses still that are still found in Grandmas garden. Celebrate the everlasting wonder of these most precious blooms and make their day memorable with the ageless charm of our softest pink spray roses—gathered in a bundle of 10 stems—paired with 20 blank note cards adorned with our four favorite Redoute rose prints. Youll transport them back to the days of lush rose gardens and elegant handwritten notes. Note cards each measure 4.25 W"×5.5"L. Please read our special Rose Care Instructions. Important Delivery Information Please note if your recipient is not home at time of delivery, the package will be left at their door. Bear in mind that your gift is a perishable item. Be sure to select a delivery address where! they can be cared for immediately upon arrival. NOTE: Available for delivery only within the continental United States. Due to agricultural restrictions, this product is not available for Saturday delivery in the states of Arizona and California.>
<mid_pid:11948^1002>
<merchantCategory:Flowers, Gifts, and Occasions/Flowers and Bouquets/Special Occasion Arrangements/Mother's Day>

3.2 Lexical Analysis

In this example, three text fields are processed: (1) title, (2) description and (3) merchant category. A lexer (lexical-analysis module) may apply the following processing steps:

1. Common HTML character-entity references are replaced by their corresponding ASCII characters.
2. Text fields are then split into strings by treating any non-alphanumeric character as a delimiter (A single quote mark is treated as alphanumeric character).
3. A product-model-no. test is applied to all strings. A product model no. is defined as any string that satisfies the regex [0-9]*[A-Z]+[A-Z0-9]*.
4. All strings except product model numbers are reduced to lower case.
5. All strings except product model numbers are stemmed using the Porter stemmer. (M. F. Porter. "An algorithm for suffix stripping"; Program, 14(3):130-137, 1980. Reprinted in Sparck Jones, Karen, and Peter Willet, 1997, Readings in Information Retrieval, San Francisco: Morgan Kaufmann, ISBN 1-55860-454-4, herein referred to as "Porter")
6. A pre-defined list of stop words is used to filter out very common features from the text fields. Strings consisting of purely digits are also eliminated.
7. Certain bigrams (two-word phrases) are detected as single tokens. Higher order n-grams) may also be used in categorization.

Each unique string resulting from these steps constitutes a unique token.

3.3 Features Computed from Text Tokens

The "feature" corresponding to each text token may simply be the per-document count of the occurrences of the token in the document. Each token instance may be assigned a weight that depends on the field from which it was extracted and may depend on the position of the feature within the field. Specifically one may multiply the token counts from the Title and Merchant Category by two before adding them to the overall count. The Description term counts may be taken unaltered. A position-dependent rule one may implement is to weight the last word of the title more heavily in an attempt to find the head noun in a noun phrase (i.e. the title), which may lead to a slight increase in accuracy.

One may also use token-feature clustering (e.g. distributional clustering) where several tokens (members of a single cluster) are all treated as the same token.

3.4 Non-Text Features

As discussed above, the product records may contain fields that are not free text. They may include: (1) Merchant id and (2) Price, and others. Embodiments in which the features are used are described in the section entitled Category Refinement.

3.5 Feature Selection

Feature selection may be performed by ranking individual features x by their mutual information $I(C,X)$ with the category variable:

$$I(C, X) = \sum_c \sum_{x=0}^{1} p(c, x) \log \frac{p(c, x)}{p(c)p(x)}$$

where the x sum is over x=0 and x=1 and the c sum is over all the categories (classes). The probability estimates for p(c, x) are obtained by simple counting and the binary variable x indicates the presence (x=1) or absence (x=0) of the associated term. In terms of the terminology this is, strictly speaking, a different feature than the associated term count used in a classifier (Naive Bayes, for example) for actual categorization. This may be beneficial for numerical reasons. The alternative is to sum over all possible term counts from 0 to infinity, which may cause problems due to the potential sparseness of the associated probability estimates.

The ranked list is processed in order of decreasing mutual information. For each number m of features a classifier is trained using the first m from the list and its accuracy is measured using cross validation. Features are added until the accuracy measured this way starts to decrease.

The number of features may also be controlled by setting a frequency-threshold limit. Features whose frequency is less than the threshold limit may be eliminated. There may be two or three combinations of the threshold and number of features that result in the best accuracy figures as reported by cross validation.

This process may be performed for every classifier (categorizer) in the classifier hierarchy. Thus each classifier may use a different feature set and a different number of features in general. The following list shows example numbers of features for example classifiers:
Root Node 112156
Jewelry 10812
Diamonds 3159
Appliances 3122
Small Appliances 8283
Large Appliances 5190
Apparel 17938
Baby Clothing 3626
Maternity 2237

3.6 Category Refinement

According to one aspect of the invention, a method for categorizing a product offering in multiple passes is provided. The first step is performing a first categorization to associate the product offering with a first product category. If the first product category is in a set of co-refinable product categories, performing a second categorization within the set of co-refinable product categories to associate the product offering with a second product category. Further, the second product offering is in the set of co-refinable product categories, the first product offering is in a first set of product offerings, and the set of co-refinable product categories is a proper subset of the first set of product offerings. A set of co-refinable product categories is defined as a set of product categories that have, by any method, been determined to have relatively high likelihood of being confused (one for another) or having one product category in the set being chosen in place of another product category in the set.

Those categories that are selected for use in the second pass, the co-refinable product categories, are selected based on the category that you are looking at. For example, the co-refinable product categories may be determined based on likelihood of confusing the other categories for the particular category. One method of determining whether two categories are often confused is to perform a manual categorization of a set of product offerings. The manual categorization will be treated as correct—the gold standard. Then perform an automatic categorization of the same set of product offerings. Graph the results in a matrix where one axis represents the categories chosen by the gold standard (in this case manual) categorizer and the other axis represents the categories chosen by the automatic categorizer. Excluding all of the cells in the matrix where the manual and automatic categorization chose the same category (possibly along the diagonal, depending on implementation), the cells with the highest probability represent the categories that are most likely to be confused. The set of co-refinable product categories may then be based on the cells that are most likely to be confused, and may, in fact, contain multiple distinct sets of co-refinable product categories and these sets may each contain a different number of categories than the other.

Figure 6:
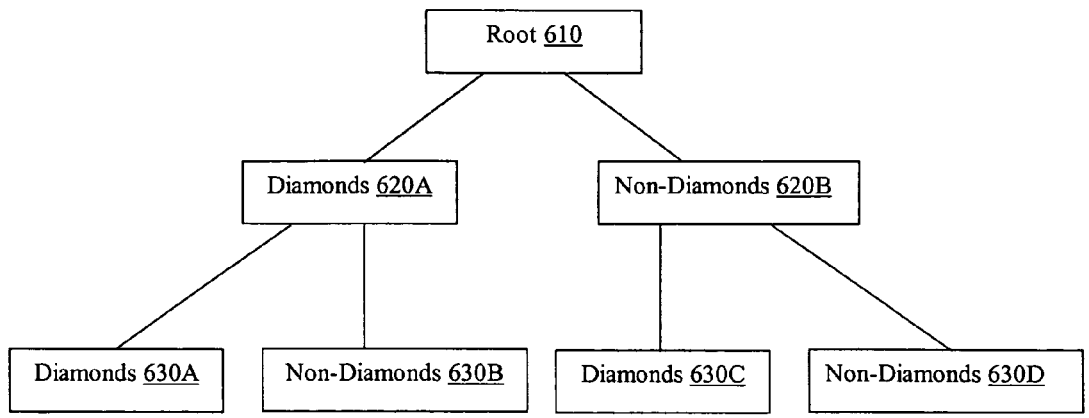
FIG. 6 is an illustration of a structure of co-refinable product categories.

FIG. 6 is an illustration of a structure of co-refinable product categories.

Herein is provided one example of category refinement. The techniques described herein are not limited to such an embodiment. Consider an automatic classifier built based on a Naive Bayes categorizer. Example Naïve Bayes categorizers are described in David D. Lewis, "Naive (Bayes) at forty: The independence assumption in information retrieval"; in Claire N'edellec and C'eline Rouveirol, editors, Proceedings of ECML-98, 10th European Conference on Machine Learning, number 1398, pages 4-15, Chemnitz, Del., 1998, herein referred to as "Lewis". The categorizer may have two or more levels of categorization. At the top (root) level 610 one may perform a flat categorization where each category is described by a single multinomial distribution as described in the section entitled Naive Bayes. One may use a mixture of multinomials to model the term-probability distribution for certain categories. Strictly speaking, this violates the Naive Bayes conditional-independence assumption, but one may simply assume that certain categories may be further decomposed into other categories that do follow the assumption, but it is unknown a priori what they are.

Then a second categorization is performed on certain categories 620A, 620B that are in a set of co-refinable categories. The categories may be those in the list below, which has been divided into three "confusion groups". The top-level nodes 620A, 620B in each group have classifiers that perform a second classification into just the categories in the confusion group 630A, 630B, 630C, and 630D. For example, in the Jewelry case the Jewelry-node classifier 620B and the Diamonds-node classifier 620A are each trained to assign one of the two categories Jewelry 630B, 630D and Diamonds 630A, 630C (A terminology shorthand is used herein referring to "Jewelry>Diamonds" as simply "Diamonds". This may be beneficial in cases where doing so is unambiguous). Thus there are two (first-level-node.second-level-node) paths by which may be labeled as Diamonds; namely, (Diamonds.Diamonds; 610→620A→630A) and (Jewelry.Diamonds; 610→620B→630C). Here, the term "classifier" refers to categorization in the context of a particular node.
Jewelry:
Jewelry
Jewelry>Diamonds
Appliances
Home, Garden & Garage>Appliances>Small Appliances
Home, Garden & Garage>Appliances>Large Appliances
Home, Garden & Garage>Appliances
Apparel
Apparel Apparel>Maternity
Apparel>Baby Clothing Thus there are eight second-level classifiers—one two-class and two three-class classifiers in this example.

3.7 Merchant ID

For Merchant id one may use the simplest possible model—multi-Bernoulli. That is, one may have a different probability-value estimate for every (category, merchant) pair. That is, one may have estimates for the set of values {p(c|m)} where m represents Merchant id. These values are denoted by $\{\psi_{c,m}\}$.

3.8 Price

Describing price statistics with a log-normal distribution: Price may be approximately distributed according to a Log-Normal distribution, which means simply that log-price is distributed according to a simple Normal/Gaussian distribution. Let z=log (price). Resulting in the following, where $\mu_c$ and $\sigma_c$ are the mean and standard deviation of a Normal distribution:

$$p(z \mid c) = \frac{1}{\sigma_c \sqrt{2\pi}} \exp\left\{-\frac{1}{2}[(z - \mu_c)/\sigma_c]^2\right\} \quad (1)$$

There is a subtle issue here that should not cause problems, but may cause confusion if not taken into consideration. This Gaussian p(z|c) is a density and therefore has dimensional units. For example if z were measured in meters p(z|c) may have units of probability per meter or one may just say inverse meters if one thinks of probability as a dimensionless quantity. This is different from the multinomial (or multi-Bernoulli) term probabilities that are uses to model the text. Those are actual probabilities; not densities. To get an actual probability value from p(z|c) it may be integrated over some finite (non-infinitesimal) interval in z. That process would cancel out the units of z and p(z|c). This may not be of concern, however, because one may be interested, in p(c|x) (where z is one component of the vector x). As long as the same z units are used for all categories there will simply be a constant multiplicative factor (or an additive factor if one is dealing with p(z|c)) floating around. For log(z) one may use base-10 logarithms because they are easy to mentally convert back to prices: i.e. 2=log(100), 3=log(1000) and so on.

Also, when the logarithm log(p(z|c)) is calculated, it does not matter what base is used for the logarithms as long as the same base is used for all categories. Natural (base-e) logarithms may be used for this for convenience.

So, in summary:

$$\log p(z \mid c) \rightarrow \ln p(z \mid c) = -\frac{1}{2}[(z - \mu_c)/\sigma_c]^2 - \ln \sigma_c - \frac{1}{2}\ln(2\pi) \quad (2)$$

where $z=\log_{10}$(price). The $-\frac{1}{2} \ln(2\pi)$ term may be dropped, as long as it is dropped everywhere. It may be safer to keep it, however, for diagnostic purposes.

Figure 7:
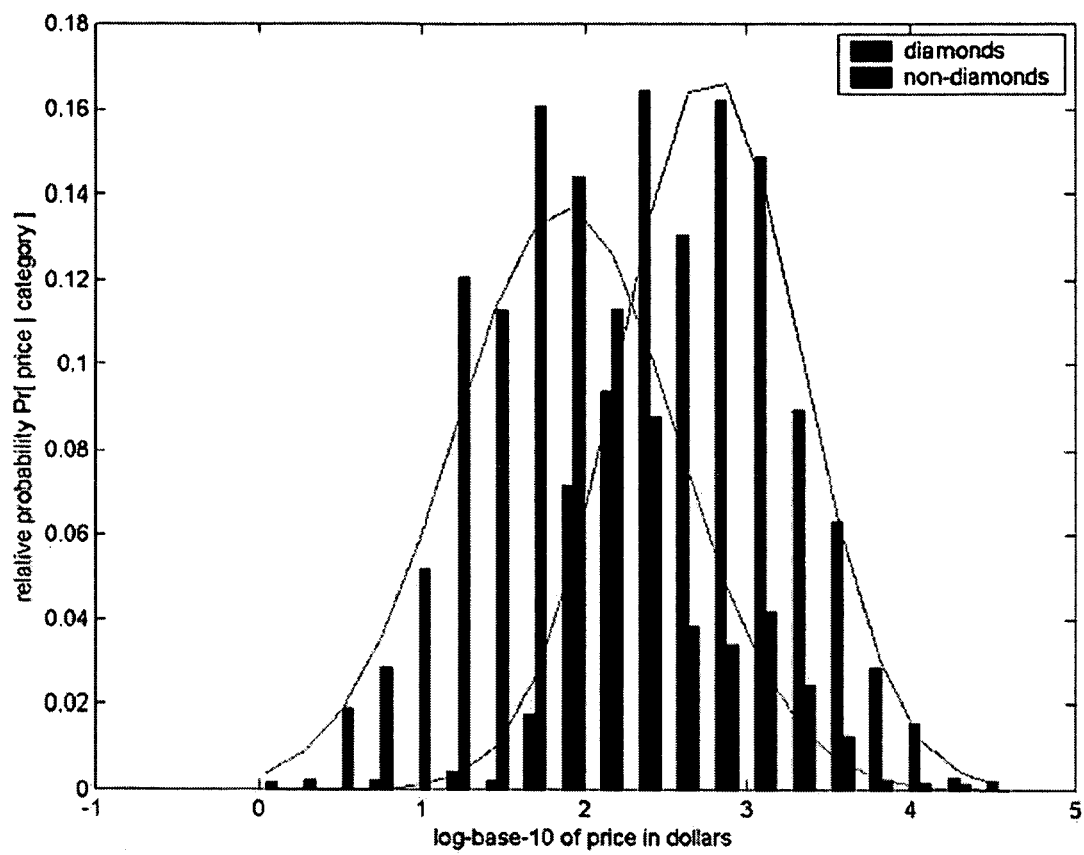
FIG. 7 is a graph of log-price distributions for diamonds and non-diamonds showing their Gaussian shapes.

FIG. 7 is a graph of log-price distributions for diamonds and non-diamonds showing their Gaussian shapes. The solid curves are fitted Gaussian distributions.

Price may be used as a feature in the Jewelry.Non-Diamonds and Jewelry.Diamonds second-level categorizers. The log-price distributions for these two categories are shown in FIG. 7 where their Gaussian (Normal) shapes are clearly evident.

Describing log-price statistics with a mixture of normal distributions: The z (log-price) distribution may be fitted to a mixture of Gaussians. Thereby, price may be used as a feature in all classifiers. Comparing with (1), this may take the form:

$$p(z \mid c) = \sum_{k=1}^{n_c} \frac{\alpha_{c,k}}{\sigma_{c,k} \sqrt{2\pi}} \exp\left\{-\frac{1}{2}[(z - \mu_{c,k})/\sigma_{c,k}]^2\right\} \quad (3)$$

where $n_c$ is the number of mixture components for category c and $\alpha_{c,k}$ is the mixing coefficient for the $k^{th}$ component of category c's log-price distribution.

In the embodiments described above, merchant ID and price are fields that are given separate independent treatment in performing the categorization operation. These are examples of a broader idea of basing the categorization of a product offering on values and fields other than the text description. The present invention is not limited to these two examples. For example, product brand, product weight, product dimensions, carat weight, or any other appropriate field may be used. In some cases, the categorization of a product offering may be based on the existence of a field for the product offering. For example, if carat weight (or karat weight) is included in the description, then the product category may be more likely to be one including jewelry made of diamonds, gold, and other precious stones and metals.

3.9 Special Rules

Special rules may be applied to aid the categorization. For example, one may use the following rule: If the initial classifier category assignment is anything but Sports and Outdoors and the Merchant Category is "bumper stickers" then the final classifier choice is set to: Home, Garden and Garage/Arts, Antiques and Collectibles. This may be useful, for example, if a merchant has a large number of bumper stickers for sale for which the available (to the categorizer) useful product information consists of only the Title field set equal to what is printed on the bumper sticker and the Merchant Category field set to "bumper stickers". Without the latter, there may be no way for an automatic categorizer to make a reliable determination, since the titles do not reflect the product category.

3.10 Selecting Products for Manual Review

Confidence and Expected Cost

Most enterprises that utilize techniques for automated product categorization will rely on the techniques to accurately categorize many of the incoming products. An automated product categorizer, however, may not always categorize products correctly. In order to handle miscategorized products, an enterprise may include a manual review of some of the categorizations of products. It would be overly burdensome to manually review all of the product categorizations made by the automated product categorizer. Therefore, a decision must be made as to which product categorizations to review. Various techniques for selecting product categorizations for manual review are discussed below.

3.10.1 Confidence

One may compute a confidence estimate for every product. This is just the probability estimate p(c'|x) computed by the classifier. One may use this computed confidence to flag products for review but may also use expected cost (defined below).

3.10.2 The Actual Cost of Miscategorized Products

The expected-cost calculations may make use of $k(i, c_i'', c_i')$. This is the expected differential cost of categorizing product i as category $c_i'$, if its true category were $c_i''$. It is "differential" because it is the difference between the cost of categorizing product i as $c_i'$ and the cost of categorizing it as its true category $c_i''$. Thus, by definition $k(i, c_i'', c'')=0$. The value of k may be determined by c" and c', and any other information (e.g. product-specific or merchant-specific) that improves the quality of this estimate may be directly included in k in a straightforward manner.

Before considering the expected cost, one may consider the actual cost of such a miscategorization. Let r(c) denote the CPC rate of category c. Assume that $r(c_i) < r(c_i')$. In that case every click on product i has associated with it a differential cost of $\delta_i = r(c_i'') - r(c_i')$. Thus the total differential cost is the total number $N_i$ of clicks on product i throughout its life at a product search provider multiplied times $\delta_i$. Also, one may write $N_i = l_i p_i$ where $l_i$ is the life of product i at the product search provider and $p_i$ is the click rate for product i. If $c_i''$ is used for other purposes such as computing search relevance, there may also be some additional cost in the product may be harder to find. If $r(c_i'') = r(c_i')$, this additional cost will be the only cost. One may neglect this other cost in this analysis. If it is known, it is easy to factor into computing expected cost.

Another cost that is difficult to quantify is the cost associated with the case where $r(c_i') > r(c_i'')$. Superficially, this looks like extra revenue rather than a loss (cost), but there is a customer-service cost, it is detrimental a provider's reputation, etc. Lacking a reliable quantification of this cost, however, one may assume the cost is the same regardless of which way the error goes—higher CPC rate or lower CPC rate. This also appeals to one's sense of fairness.

Thus for the purposes of analysis, one may use the following:

$$k(i, c_i'', c_i') = l_i p_i |r(c_i') - r(c_i'')| \quad (4)$$

In other embodiments, in addition to being based on the factors mentioned above, k( ) may be calculated based on expected click rate for each category; the life of the product at the product search provider; likelihood that, if a product is miscategorized, a merchant will pull a product or not add a new product offering that may have otherwise been added; expected click rate if the product is miscategorized; or any other appropriate value related to direct or indirect costs.

3.10.3 Expected Cost

In many product categorization systems, it is possible for products to be miscategorized. When products are miscategorized there are direct and indirect costs. Since products in different categories may each have a different CPC, direct costs may include the difference in revenue made on an item during the life of a product. If products are miscategorized, merchants may either pull their products from the site or not enter new products to the site, resulting in indirect costs associated with the miscategorization.

There are many possible equations for expected costs. The expected cost may be based on the cost per click of one or more categories, the life of the product, the likelihood that a merchant will pull products or not add new products if its products are miscategorized, or any other appropriate value.

"Ideal" Expected Cost: For every product (represented by feature vector x) the categorizer computes probability estimates p(c|x) for every category. These are probabilities that the product belongs to the associated category. If one uses the "ideal" Bayes classifier, which is based on the "true" joint probability p(c, x), the amount of money that the provider (or the merchant) may expect to lose, on average, on products with exactly this feature vector x (or even just this exact set of class probabilities) is given by:

$$k'_{ave} = \sum_{c''' \neq c''} p(c''' | x_i) k(i, c''', c''), \quad (5)$$

It is worth noting that p(c"|x) fraction of such products will have been categorized correctly and there will be no CPC-related loss associated with them.

One may flag products for review based on the "true" expected cost of (5). Since one may not know the true a posteriori category probabilities {p(c"|x)} however, one may use the expected cost formula of (5), but substitute the estimates of {p(c"|x)} computed by a classifier (Naive Bayes, for example). Also, as mentioned above, practical considerations may dictate that one may use the estimate of (4) for k(i, c''', c'') in (5).

A threshold may be applied to the expected cost computed in this manner and those products whose expected cost is above the threshold have an additional process performed on them. The additional process may be flagging the categorization for manual review or performing an automatic, more computationally expensive categorization process on the product offering. The value of the threshold may be computed based simply on manual-categorizer workload capacity or it may be an optimal value representing the point at which the CPC-related cost is equal to the manual-review cost.

In the example above, the categorizations that have an expected cost above the predefined threshold are flagged for manual review. In other embodiments, other additional processes may be performed such as further automatic categorization. Examples of further categorization include categorization based on expected cost (see below) and categorization based on category refinement (see above).

3.11 Automatic Categorization Based on Expected Cost

As explained above, as one part of the categorization process, a probability may be determined for each category of a set of categories. However, under some circumstance, the categorization process may indicate that one or more of the categories are reasonable possibilities for the categorization. In such circumstances, one may consider the expected cost (direct and/or indirect: described above) for each of the categories and choose the one with the lowest expected cost. In that case, the category with the highest probability may be, but is not necessarily, chosen and other factors, such as the cost (direct or indirect), may be factored in.

One may make automatic-categorization decisions based on expected cost. When using a classifier such as Naive Bayes that produces probability estimates for all categories, one may choose the category based on expected cost. A formula such as (5) used to determine which products should be manually reviewed may be used. The category c″ may be chosen to minimize:

$$c'' = \operatorname*{argmin}_{c''' \neq c''} \sum p(c''' \mid x_i) k(i, c''', c''), \quad (6)$$

and the product category with the minimum value may be assigned as the product category for the product offering.

4.0 HARDWARE OVERVIEW

Figure 8:
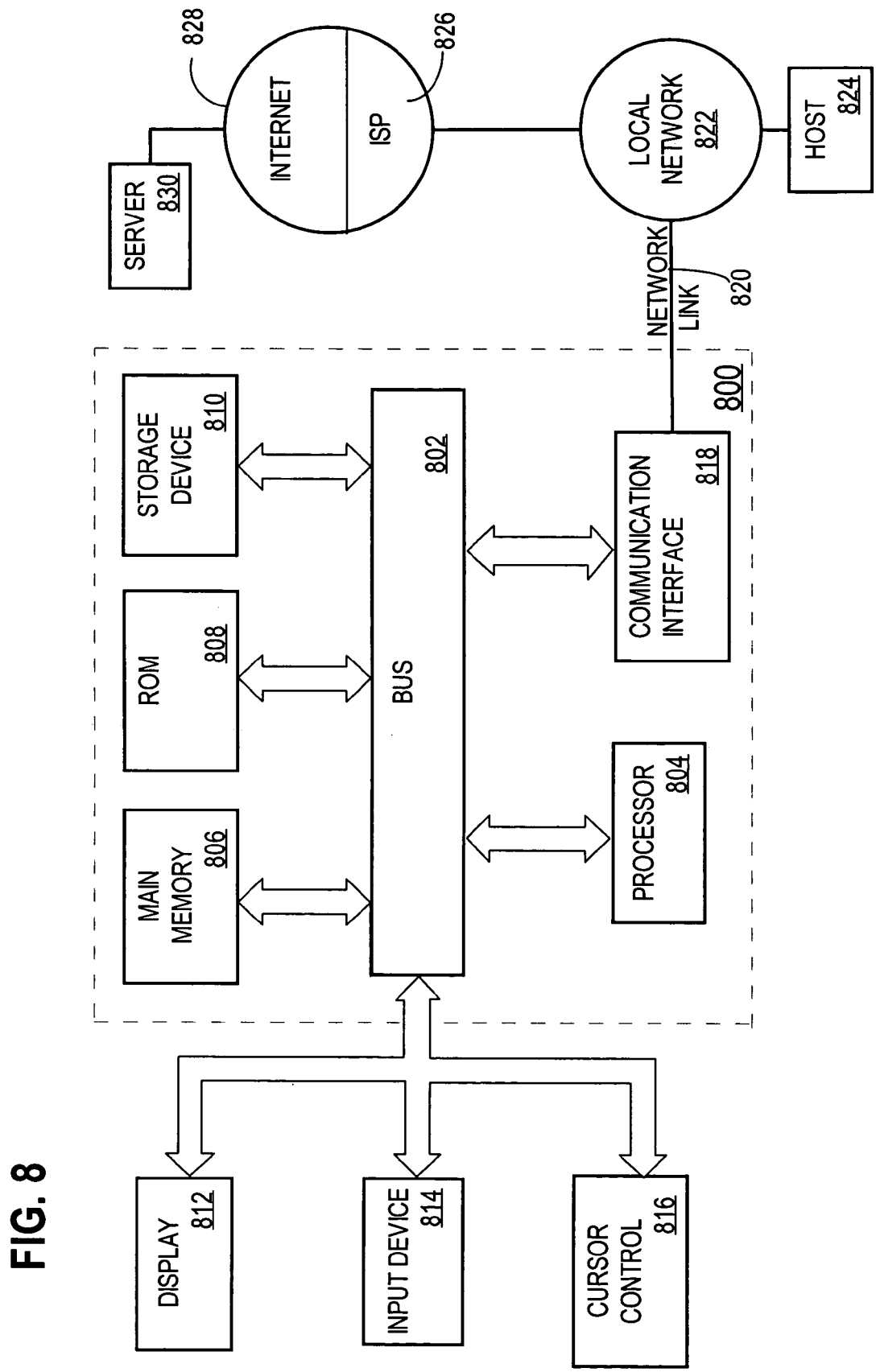
FIG. 8 is a block diagram that illustrates a computer system 800 upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

5.0 NAIVE BAYES

5.1 The Naive Bayes Assumption

The so-called "Naive Bayes" assumption is simply one of statistical independence. Let x and y be two random variables (e.g. the height and weight of people from some population). Let p(x, y) represent the joint probability density of these two. The Naive-Bayes assumption is simply that:

$$p(x,y)=p(x)p(x).$$

More generally for a set of random variables $x \triangleq (x_1, x_2, \ldots, x_m)$, the assumption is:

$$p(x) = \prod_{i=1}^{m} p(x_i). \quad (4)$$

5.2 The Naive Bayes Classifier for Text

In machine learning and pattern classification the objects to be categorized (or "classified") are represented by what are referred to as "feature vectors" x, which contain the information that is used to determine the most likely category that the document belongs to. The so-called "Naïve Bayes" classifier for documents assumes something called the "bag-of-words" model (see Lewis). This means that the particular sequence of words is ignored and only their counts are used. This limitation is circumvented somewhat when phrases are detected as tokens and treated as if they were individual terms. In the (Naive Bayes) case the feature vectors may be of the form:

$$x=(k_1, k_2, \ldots, k_m),$$

where $k_i$ denotes the number of occurrences (in the document to be categorized) of the $i_{th}$ term and m is the total number of terms in the lexicon, which in this case refers to the set of terms being used to do the categorization, after stopword removal and so on.

The Bayes Classifier may use probability models in the following way: Given a feature vector x, compute the conditional probability that the document belongs to category c given the document's feature vector x. To perform categorization, choose the value c' for c (i.e. the assignment of the document to a category) that maximizes p(c|x). Mathematically, this may be expressed as:

$$c'=\arg\max_c p(c|x)$$

This conditional probability p(c|x) may be decomposed as follows:

$$p(c|x)=(p(x|c)p(c))/p(x)$$

Because one may only interested in the value of c' and not the specific value of p(c'|x) one may ignore the marginal probability p(x), which only depends on x and not c:

$$c'=\arg\max_c[p(x|c)p(c)]] \quad (5)$$

The probability in this equation is the joint probability p(x, c):

$$p(x,c)=p(x|c)p(c)$$

To carry out the actual categorization process specific formulas are needed for p(c) and p(x|c). The Naive-Bayes/bag-of-words model may use a multinomial distribution for this. That is:

$$p(x \mid c) = \binom{n}{\{k_i\}} \prod_{j=1}^{m} \theta_{c,j}^{k_j} \quad (6)$$

This formula includes the following shorthand notation for something called a "multinomial coefficient":

$$\binom{n}{\{k_i\}} \equiv \frac{n!}{\prod_{i=1}^{m} k_i!} \quad (7)$$

where n! represents "n factorial" and denotes the product:

$$n!=n(n-1)(n-2)(n-3) \ldots 3 \times 2.$$

Because this multinomial coefficient is a function of only the document and not the class, it too may be ignored in the categorization process. The parameters $\{\theta_i\}$ are often referred to as "Bernoulli" parameters and may be estimated from the training data. This ("{ . . . }") is a shorthand set notation. For example $\{\theta i\}$ really denotes $\{\theta_i | i=1, 2, \ldots, m\}$, i.e. the complete set of these parameter values.

For each category, one may have values for p(x|c) and p(c) and each of these may have their own estimated parameter values. The Bernoulli parameter for term i within category c is represented and may be estimated by the following:

$$\theta'_{i,c} = \frac{n_{i,c} + 1}{n_c + m} \quad (8)$$

where $n_{i,c}$ is the total number of instances of term i in the entire collection of category-c training documents, $n_c$ is the total number of instances of all terms in the entire collection of category-c training documents (terms in the categorization lexicon; not stop words, etc.), and m is the total number of terms in the lexicon. The formula (8) is known as "Laplace's rule" or "Laplace's Rule of Succession".

To perform the categorization described by (5) one may need estimates for the marginal class probabilities $\{p(c)\}$. One may represent these estimates by $\phi'_c$ and use a form of Laplace's rule for them also:

$$\phi'_c = \frac{v_c + 1}{N + |C|} \quad (9)$$

where $v_c$ is the total number of category-c documents in the training set, N is the total number of documents (all categories) in the training set, and |C| is the total number of categories. If these numbers ($\{v_c\}$ and N) are not representative of the ultimate population of documents to be categorized, then the correct estimates (obtained by whatever means) may be used for the $\{\phi'_c\}$.

The "discriminant function" d(x, c) may be defined as:

$$d(x, c) = \phi'_c \prod_{i=1}^{m} \theta'^{k_i}_{i,c} \quad (10)$$

An implementation of the categorization described by (5) may be expressed in terms of this as follows:

$$c' = \arg\max_c d(c, x) \quad (11)$$

It may be beneficial to use the logarithm of (10) as a discriminant function for both numerical and computational reasons. Thus one may have:

$$d(x, c) = \log\phi'_c + \sum_{i=1}^{m} k_i \log\theta'^{l_i}_{i,c} \quad (12)$$

5.3 Naive Bayes for Non-Text Attributes

Features

Whereas the term "Naive Bayes Classifier" may be taken as synonymous with one based on the multinomial model of (6), for non-text features, however, one may return to the more general form (4). For example, one may use merchant id and price as features. Each of these has its own distribution.

Merchant id: Here one may use a simple table of p(m|c) values (where m=merchant), one per (category, merchant) combination.

Price: may be used in a limited number of places. For example, one may use a log-normal distribution for price in some cases or may use a mixture of Gaussians over log price in others.

6.0 EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for automatically categorizing a product offering comprising the machine-implemented steps of:
    obtaining data associated with the product offering of a product;
        wherein the data includes a plurality of fields, wherein the plurality of fields include text of the product offering and one or more values associated with the product offering;
    automatically determining a particular product category, of a plurality of product categories, to which to first assign the product offering, responsive to a determination of an existence of a particular field within the plurality of fields without regard to the value of the particular field; and
    responsive to a determination that the particular product category belongs to a set of co-refinable product categories, performing a second product category assignment, wherein the second product category assignment is performed by determining which product category, of the set of co-refinable product categories, to assign to the product offering;
    wherein each category in the set of co-refinable product categories is also one of the plurality of product categories and wherein one or more categories of the plurality of product categories is not in the set of co-refinable product categories; and
    wherein the method is performed by one or more computing devices comprising one or more processors.

2. The method of claim 1, wherein the one or more values comprise one or more of a merchant identifier for the product offering, brand information for the product offering, and a price of the product offering.

3. The method of claim 1, wherein the set of co-refinable product categories is determined based on discrepancies between results of two or more different assignment methods.

4. The method of claim 1, wherein the text of the product offering comprises one or more of a title associated with the product offering and a human-readable description associated with the product offering.

5. The method of claim 1, wherein the set of co-refinable product categories is determined manually.

6. The method of claim 1, wherein one or both of the first and second assignments are determined, at least in part, by a Bayesian method.

7. The method of claim 1, wherein one or both of the first and second assignments includes assigning a plurality of product offerings.

8. The method of claim 1,
    wherein the determination for the second assignment is based on a different set of fields within the plurality of fields than the determination for the first assignment.

9. The method of claim 1, wherein the determination for the second assignment is based on a different assignment method than the determination for the first assignment.

10. The method of claim 1, wherein the determination for the second assignment is more computationally expensive than the determination for the first assignment.

11. The method of claim 1, wherein one or both of the first and second assignments are based, at least in part, on one or more of assignment-error costs, results of a confusion matrix, likelihood that a given product offering would be mistakenly categorized into each other product category in the plurality of categories, and an existence of a particular field within the plurality of fields without regard to the value of that particular field.

12. The method of claim 1, wherein the co-refinable product category sets are based on the likelihood of incorrectly assigning between the members of the co-refinable product category set.

13. The method of claim 1, wherein one or more values are distinct and separate from the text of the product offering.

14. The method of claim 1, wherein the determination for the second assignment is based, at least in part, only on categories which are members of the co-refinable set.

15. A non-transitory computer-readable storage medium storing instructions, the instructions including instructions for automatically categorizing a product offering which, when executed by one or more processors, cause the one or more processors to perform the steps of:
  obtaining data associated with the product offering of a product;
    wherein the data includes a plurality of fields, wherein the plurality of fields include text of the product offering and one or more values associated with the product offering;
  automatically determining a particular product category, of a plurality of product categories, to which to first assign the product offering, responsive to a determination of an existence of a particular field within the plurality of fields without regard to the value of the particular field; and
  responsive to a determination that the particular product category belongs to a set of co-refinable product categories, performing a second product category assignment, wherein the second product category assignment is performed by determining which product category, of the set of co-refinable product categories, to assign to the product offering;
  wherein each category in the set of co-refinable product categories is also one of the plurality of product categories and wherein one or more categories of the plurality of product categories is not in the set of co-refinable product categories.

16. The non-transitory computer-readable storage medium of claim 15, wherein the one or more values comprise one or more of a merchant identifier for the product offering, brand information for the product offering, and a price of the product offering.

17. The non-transitory computer-readable storage medium of claim 15, wherein the set of co-refinable product categories is determined based on discrepancies between results of two or more different assignment methods.

18. The non-transitory computer-readable storage medium of claim 15, wherein the text of the product offering comprises one or more of a title associated with the product offering and a human-readable description associated with the product offering.

19. The non-transitory computer-readable storage medium of claim 15, wherein the set of co-refinable product categories is determined manually.

20. The non-transitory computer-readable storage medium of claim 15, wherein one or both of the first and second assignments are determined, at least in part, by a Bayesian method.

21. The non-transitory computer-readable storage medium of claim 15, wherein one or both of the first and second assignments includes assigning a plurality of product offerings.

22. The non-transitory computer-readable storage medium of claim 15,
  wherein the determination for the second assignment is based on a different set of fields within the plurality of fields than the determination for the first assignment.

23. The non-transitory computer-readable storage medium of claim 15, wherein the determination for the second assignment is based on a different assignment method than the determination for the first assignment.

24. The non-transitory computer-readable storage medium of claim 15, wherein the determination for the second assignment is more computationally expensive than the determination for the first assignment.

25. The non-transitory computer-readable storage medium of claim 15, wherein one or both of the first and second assignments are based, at least in part, on one or more of assignment-error costs, results of a confusion matrix, likelihood that a given product offering would be mistakenly categorized into each other product category in the plurality of categories, and an existence of a particular field within the plurality of fields without regard to the value of that particular field.

26. The non-transitory computer-readable storage medium of claim 15, wherein the co-refinable product category sets are based on the likelihood of incorrectly assigning between the members of the co-refinable product category set.

27. The non-transitory computer-readable storage medium of claim 15, wherein one or more values are distinct and separate from the text of the product offering.

28. The non-transitory computer-readable storage medium of claim 15, wherein the determination for the second assignment is based, at least in part, only on categories which are members of the co-refinable set.

29. An apparatus for automatically categorizing a product offering, comprising:
  one or more processors; and
  a non-transitory computer-readable medium storing instructions which, when processed by the one or more processors, causes the one or more processors to perform the steps of:
    obtaining data associated with the product offering of a product;
    wherein the data includes a plurality of fields, wherein the plurality of fields include text of the product offering and one or more values associated with the product offering;
    automatically determining a particular product category, of a plurality of product categories, to which to first assign the product offering; and
    determining that the particular product category belongs to a set of co-refinable product categories, and performing a second product category assignment, wherein the second product category assignment is performed by determining which product category, of the set of co-refinable product categories, to assign to the product offering;
    wherein the set of co-refinable product categories is a strict subset of the plurality of product categories.

30. The apparatus of claim 29, wherein the one or more values comprise one or more of a merchant identifier for the product offering, brand information for the product offering, and a price of the product offering.

31. The apparatus of claim 29, wherein the set of co-refinable product categories is determined based on discrepancies between results of two or more different assignment methods.

32. The apparatus of claim 29, wherein the text of the product offering comprises one or more of a title associated with the product offering and a human-readable description associated with the product offering.

33. The apparatus of claim 29, wherein the set of co-refinable product categories is determined manually.

34. The apparatus of claim 29, wherein one or both of the first and second assignments are determined, at least in part, by a Bayesian method.

35. The apparatus of claim 29, wherein one or both of the first and second assignments includes assigning a plurality of product offerings.

36. The apparatus of claim 29, wherein the determination for the second assignment is based on a different set of fields within the plurality of fields than the determination for the first assignment.

37. The apparatus of claim 29, wherein the determination for the second assignment is based on a different assignment method than the determination for the first assignment.

38. The apparatus of claim 29, wherein the determination for the second assignment is more computationally expensive than the determination for the first assignment.

39. The apparatus of claim 29, wherein one or both of the first and second assignments are based, at least in part, on one or more of assignment-error costs, results of a confusion matrix, likelihood that a given product offering would be mistakenly categorized into each other product category in the plurality of categories, and an existence of a particular field within the plurality of fields without regard to the value of that particular field.

40. The apparatus of claim 29, wherein the co-refinable product category sets are based on the likelihood of incorrectly assigning between the members of the co-refinable product category set.

41. The apparatus of claim 29, wherein one or more values are distinct and separate from the text of the product offering.

42. The apparatus of claim 29, wherein the determination for the second assignment is based, at least in part, only on categories which are members of the co-refinable set.

* * * * *